Patented Aug. 14, 1951

2,564,488

UNITED STATES PATENT OFFICE 2,564,488

ALKYLATION OF TOLUENE BY PROPYLENE CATALYZED BY ACID ACTIVATED MONTMORILLONITE CLAY

John E. Mahan, Bartlesville, Okla., assignor to Phillips Petroleum Company, a corporation of Delaware No Drawing. Application December 17, 1948, Serial No. 65,971

5 Claims. (Cl. 260—671)

1

The present invention relates to the alkylation of olefinic hydrocarbons with toluene in the presence of a specific catalyst. In one of its modifications the present invention relates to the preparation of meta and para cymenes to the substantial exclusion of the ortho isomer by the alkylation of propylene and toluene in the presence of acid-activated montmorillonite sub-bentonite catalyst.

Of the many possible alkyl substituted toluene compounds, possible by the present process, cymene is particularly valuable. The isomeric cymenes are valuable intermediates for the production of many organic compounds such as acids, ketones, and the like. In plentiful supply they have many potential uses in addition to their present applications. However cymenes have usually been obtained from sources which limited their production. Para cymene, for example, has been obtained from spruce turpentine and as a by-product from the manufacture of sulfite paper.

An obvious method for the production of these particularly important cymenes would apparently lie in the alkylation of toluene with propylene. The propylation of toluene has been reported employing aluminum chloride, but with rather low yields of a mixture of the isomeric cymenes. The condensation of olefins with toluene has also been reported in a reaction catalyzed with phosphorus pentoxide; in this experiment the results with propylene show only about 40 volume per cent conversion and it is not shown that the product fraction was analyzed for relative proportions of isomeric cymenes. Due to the fact that all three possible isomeric cymenes—ortho, meta, and para—boil within four or five degrees Fahrenheit of each other, earlier methods of analysis to determine the relative proportions of each isomer in a cymene fraction were unsatisfactory and were generally not attempted. More recently with the aid of infrared spectral analysis, it is possible to determine the percentage of each of the isomers present in a cymene fraction. Thus in a recent article in the Journal of American Chemical Society, the cymene product of an alkylation experiment which formerly had been reported to result in the exclusive formation of para cymene, was reanalyzed in a duplication of the experiment and found to contain less than 50 per cent of the para and substantially equal amounts of each of the ortho and meta isomers; analysis by Raman spectra showed substantially equal proportions of each of the three isomers.

Since it is known that the methyl group ordinarily directs an entering group to the ortho and para positions, a mixture of the ortho and para cymenes, possibly predominately the para compound, would have been expected from such alkylation procedures. However, attempts to operate in this manner have, in the past, led to the production of mixtures comprising substantially equal proportions of ortho, meta, and para cymenes. Since these isomers all boil within a narrow range, namely from 347 to 353° F. and since the separation of the components of a ternary mixture is especially difficult, particularly where the boiling points of the constituents lie within a narrow range, the isolation of the individual components involve difficult and expensive operations which are obviously unattractive from a commercial viewpoint. However, the individual isomers have other particular properties which make a separation desirable.

I have now discovered a process for the selective alkylation of toluene with olefines at elevated temperatures and pressure in the presence of a specific acid-activated montmorillonite sub-bentonite catalyst. For example, propylene can be alkylated with toluene to prepare a cymene product which comprises the meta and para cymenes and only a negligible amount of the ortho isomer.

The differences in boiling points between the respective isomers of isopropyl toluene is perhaps smaller than that between the respective isomers of other derivatives of toluene with the possible exception of ethyl-substituted toluene. Hence the process may be conveniently described with regard to the preparation of isopropyl derivatives of toluene, i. e., the cymenes. Since the alkylation of toluene with propylene has heretofore produced mixtures of ortho, meta, and para cymenes as explained before and since according to well established theories of orientation the methyl group would be expected to direct the alkylation to the ortho and para positions, any modification of the findings of the prior art would be expected to proceed by directing the alkylation to the theoretical course, namely the production of mixtures of ortho and para isomers. It is therefore an unexpected feature of my process that the reaction is directed to the production of the meta and para isomers almost to the degree of complete exclusion of the ortho compound.

A significant feature of my process is, then, that the more valuable meta and para cymenes are formed as the principal product. Another advantage lies in the fact that these compounds are more readily separable from each other than from the ternary mixtures of the prior art, wherein the ortho isomer was produced in amounts substantially equal to those of the meta and para cymenes. A still further advantage lies in the high degree of conversion of starting materials to desired products, namely the meta and para cymenes, as disclosed hereinafter.

The solid type catalyst of my invention is described as a montmorillonite sub-bentonite clay which has the idealized formula $$Al_2Si_4O_{10}(OH_2) \cdot nH_2O$$

The actual mineral, however, has every sixth aluminum ion replaced by a magnesium ion. This produces a crystal lattice with a negative charge which is neutralized by the absorption of metallic cations on the surface. These surface cations are readily removed, and in the process of activation with acid, hydrogen ions are exchanged for the metallic ions, giving, in effect, a solid acid catalyst. The acid-activated material may be designated a magnesium substituted hydrogen montmorillonite. The acid treatment further enhances the catalytic activity of the material by removing inactive impurities and exposing additional contact surface. A catalytic material of this type is sold commercially under the trade name of "Super-Filtrol." It is specifically noted that this activated montmorillonite is not the same as the acid-washed bentonites, Florida and fuller's earths, and kaolin and similar silicates which have been previously described and which do not show the advantages of the presently disclosed catalytic material.

According to the process of this invention toluene is contacted with a controlled proportion of propylene over the catalyst described above at pressures of about 1000 pounds per square inch gauge and at elevated temperatures. The effluent is led into suitable fractionating equipment where unchanged toluene is removed and recycled to the process and separation and recovery of meta and para cymenes is effected. In the practice of my invention I have found that, in general, the ratio of meta cymene to para cymene will be from about 1.5:1 to about 2.0:1. Analysis of the cymene fraction by infrared absorption spectra shows that the product is substantially entirely meta and para cymene, the ortho isomer being formed in less than about five weight per cent.

Temperatures in the range from 375° to 700° are applicable to the satisfactory operation of my process, although temperatures from about 375° to about 600° F. are generally preferred. Pressures of about 1000 pounds per square inch gauge are adequate when operating in the preferred temperature range although higher pressures may be necessary when operating above this level. In any event, pressures sufficient to maintain essentially liquid phase operation will usually be required. Flow rates which provide space velocities in the range from about 1.5 to about 10 volumes of reactants per volume catalyst per hour may be used for satisfactory operation with velocities from about 1.5 to about 5 volumes of reactants per volume catalyst per hour being preferred. Mol ratios of toluene to propylene are usually maintained at about 6 or 7 to one. Ratios above or below this level may be employed when desired. The reactor may be of any suitable type capable of withstanding the pressures encountered in the process. It is found satisfactory to employ a fixed bed catalyst reactor or a suitable pressure reactor filled with a granulated catalyst as mentioned hereinbefore. Heat may be supplied to the reactor by any conventional means and/or the reactants may be preheated to reaction temperature before entering the reactor.

*Example I*

A run was made utilizing a high pressure reaction chamber filled with an 8 to 20 mesh, acid-activated, montmorillonite sub-bentonite clay. The reactor was heated to 400–405° F. and toluene in admixture with propylene in a mol ratio of 6.35:1 was pressured into the catalyst zone. Flow rates of the reactants were adjusted to provide a space velocity through the catalyst bed of 1.91 volumes of reactants per volume catalyst per hour. The pressure within the system was maintained at about 1000 pounds per square inch gauge throughout the run. Unchanged toluene was recovered from the reactor effluent by fractionation. A 92 per cent yield of cymenes was obtained which provided 396 grams of a meta cut and 198 grams of a para cut.

A comparative run was made in which toluene was alkylated with propylene using hydrofluoric acid as catalyst under optimum conditions of operation. Toluene and propylene were blended in a mol ratio of reactants of 5.96:1 and charged continuously to an agitated reactor to provide a contact time of 40 minutes. Temperature of the reaction was maintained at 90° F. and acid strength at the start of the run was 96 per cent. Pressure of the system was maintained at 40–50 pounds per square inch gauge.

Results of the two runs are compared in the table below:

| Run | Catalyst | Composition By Infrared Absorption, Weight Per Cent | | | Densities ($D_4^{20}$) | Refractive Index $n_D^{20}$ |
|---|---|---|---|---|---|---|
| | | Ortho | Meta | Para | | |
| I | Montmorillonite | 4.1 | 64.0 | 31.9 | .8602 | 1.4924 |
| II | Hydrofluoric Acid | 38.4 | 27.3 | 34.3 | .8654 | 1.4949 |

The results of the respective runs show the advantage to be realized when employing the specific catalyst of this present process (Run I) over the results obtained with usual catalyst of which hydrofluoric is typical (Run II).

*Example II*

A run was made utilizing a high pressure reaction chamber filled with an 8 to 20 mesh, acid-activated, montmorillonite sub-bentonite clay. The reactor was heated to 550–560° F. and toluene in admixture with propylene in a mol ratio of 6.34:1 was pressured into the catalyst zone. Flow rates of reactants were adjusted to provide a space velocity of 2.2 volumes of reactants per volume catalyst per hour. The pressure within the system was maintained at about 1000 pounds per square inch gauge throughout the run. Unchanged toluene was recovered from the reactor effluent by fractionation. Analysis of a sample of the product provided the following results:

| Composition by Infrared Absorption, Weight Per Cent | | | Density ($D_4^{20}$) | Refractive Index $n_D^{20}$ |
|---|---|---|---|---|
| Ortho | Meta | Para | | |
| 5.1 | 63.3 | 31.6 | .8604 | 1.4927 |

The total yield was 86.7 per cent based on toluene utilized. Fractionation of this product provided 804 grams of a meta cymene cut and 407 grams of a para cymene cut.

The foregoing disclosure and examples relate a process by which controlled alkylation of toluene may be effected. The examples are illustrative only and recite specific sets of conditions by which the respective results may be obtained. It is understood that various changes and modifications may be made in the process without departing from the inherent scope of the invention as disclosed and claimed.

I claim:

1. An improved process for the preparation of meta- and para-substituted alkylated toluene which comprises alkylating toluene with an olefin at elevated pressure and a temperature in the range of 375° to 700° F. in the presence of acid-activated montmorillonite sub-bentonite catalyst so as to produce principally a mixture of meta- and para-substituted alkylated toluene containing the ortho-isomer in an amount less than 5 weight per cent based on the weight of the alkylated product, and recovering said mixture.

2. An improved process for the preparation of meta- and para-, but very minor proportions of ortho-substituted alkylated toluene which comprises alkylating toluene with an olefin at a temperature between 375° and 700° F. and elevated pressure in the presence of acid-activated montmorillonite sub-bentonite catalyst so as to produce a mixture of meta- and para- substituted alkylated toluene containing only a very minor proportion of the ortho-isomer and recovering the resulting mixture.

3. An improved process for the preparation of meta- and para-cymene which comprises alkylating toluene with propylene at a temperature between 375° and 700° F. in the presence of acid-activated montmorillonite sub-bentonite catalyst at elevated pressure so as to produce a mixture of meta- and para-cymenes containing less than 5 weight per cent of ortho-cymene based on the weight of the cymenes and recovering the resulting mixture.

4. A process according to claim 3 in which the temperature is between 400° and 560° F. and the pressure is 1000 pounds per square inch.

5. An improved process for the controlled alkylation of propylene and toluene which comprises alkylating toluene with propylene in a ratio of propylene to toluene between 1:6 and 1:7 at a temperature between 375° and 600° F. and under pressure of the order of 1000 pounds per square inch gauge in the presence of acid-activated montmorillonite sub-bentonite catalyst so as to produce a mixture of meta- and para-cymenes containing less than 5 weight per cent of ortho-cymene based on the weight of the cymenes and recovering the resulting mixture.

JOHN E. MAHAN.

REFERENCES CITED

The following references are of record in the file of this patent:

UNITED STATES PATENTS

| Number | Name | Date |
|---|---|---|
| 2,115,884 | Schollkopf | May 3, 1938 |
| 2,374,600 | Ipatieff et al. | Apr. 24, 1945 |
| 2,384,505 | Thomas et al. | Sept. 11, 1945 |
| 2,416,022 | Schulze | Feb. 18, 1947 |
| 2,431,166 | Buell et al. | Nov. 18, 1947 |

OTHER REFERENCES

"Catalysts of the Activated Montmorillonite Type," National Petroleum News, July 7, 1943, pages R–318 to R–321.